United States Patent
Gayeski

[11] 3,749,469
[45] July 31, 1973

[54] REDUNDANT FRAUNHOFER RECORDING SYSTEM

[75] Inventor: Thomas Edward Joseph Gayeski, Princeton, N.J.

[73] Assignee: RCA Corporation, New York, N.Y.

[22] Filed: Dec. 9, 1971

[21] Appl. No.: 206,422

[52] U.S. Cl. .............................. 350/3.5, 350/162 SF
[51] Int. Cl. .......................................... G02b 27/00
[58] Field of Search ....................... 350/3.5, 162 SF; 352/85 H

[56] References Cited
UNITED STATES PATENTS
3,675,983   7/1972   La Macchia ........................ 350/3.5

OTHER PUBLICATIONS
Brooks et al., IEEE Jour. of Quantum Electronics, Vol. QE-2, N. 8, Aug. 1966, pp. 275–279.

*Primary Examiner*—David Schonberg
*Assistant Examiner*—Ronald J. Stern
*Attorney*—Edward J. Norton, Glenn H. Bruestle and Irwin M. Krittman

[57] ABSTRACT

When a pinhole array is employed as a redundancy means in recording a redundant Fraunhofer hologram, such as a holographically prerecorded motion picture, a moving noise is normally present in the reconstructed image when the hologram is moved during playback. The effect of this moving noise is eliminated by situating the hologram recording medium at or in the immediate vicinity of the image plane of the pinhole array during the recording of the hologram. By recording the hologram in this manner, flicker-type noise is also improved.

4 Claims, 4 Drawing Figures

PATENTED JUL 31 1973 3,749,469

REDUNDANT FRAUNHOFER RECORDING SYSTEM

This invention relates to a hologram recording system and, more particularly, to a redundant Fraunhofer hologram recording system.

One of the main benefits of a Fraunhofer hologram is that, during readout, the reconstructed image remains stationary even if the hologram record is moved in a direction transverse to the readout beam. Further, it is desirable that the hologram be redundant, so that the reconstructed image is not noticeably degraded by such defects as dust or scratches on the hologram record or readout optics.

A redundant Fraunhofer hologram record is particularly suitable for use in a system for playing back prerecorded motion pictures over closed circuit television apparatus. In such a system, the information contained in each frame of a motion picture may be recorded as a separate small-area redundant Fraunhofer hologram on a tape. The tape may be moved continuously in a direction transverse to a readout beam from a laser which illuminates each hologram of the tape in turn. The reconstructed image of the Fraunhofer hologram is detected by the photo-sensitive surface of a television pickup tube so that the image may be displayed on the kinescope of a television receiver.

Due to the small area of each hologram, the conventional use of a diffusing plate as the redundancy means in the recording of the holograms cannot be tolerated, since it results in degrading speckle noise in the reconstructed image of the hologram. Therefore, other types of redundancy means, for use in the recording of redundant Fraunhofer holograms, have been developed which eliminate the speckle noise while still providing high redundancy. One such redundancy means is a pinhole array spaced from the object, such as a transparency corresponding to a single frame of the motion picture being recorded, through which the object is illuminated during the recording of each small-area redundant Fraunhofer hologram.

It has been found that when such a redundant Fraunhofer hologram is moved during playback (as is the case in holographically prerecorded motion picture) an undesirable moving type noise results in the reconstructed image.

The present invention is directed to an arrangement in the recording of a redundant Fraunhofer hologram with a pinhole array redundancy means which substantially eliminates any noticeable undesired moving noise, due to defects in the optical system such as scratches, or dust on the lens, etc., in the reconstructed image when the hologram record is being moved during playback.

Briefly, this is accomplished by situating the pinhole array and the hologram recording medium with respect to the principal plane of the lens means employed for Fraunhofer focusing such that the hologram recording medium is located at or in the immediate vicinity of the image plane of the pinhole array. The effect of this is to cause an increase in the rate of motion of the image of the pinhole array as the hologram is moved sufficient to prevent any noticeable moving noise in the reconstructed image of the hologram.

This and other features and advantages of the present invention will become more apparent from the following detailed description taken together with the accompanying drawing, in which.

Figure 1:
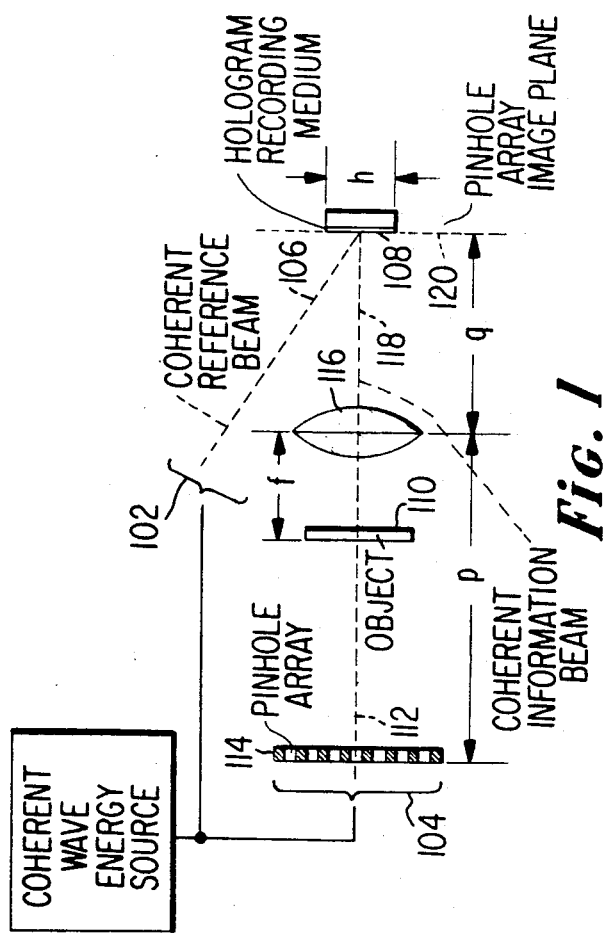
FIG. 1 illustrates in diagrammatic form one embodiment of the present invention in which the hologram recording medium is oriented in substantial coincidence with the pinhole array image plane.

Referring to FIG. 1, there is shown coherent wave energy source 100, which may include a laser and conventional optical elements such as a beam splitter, mirrors, etc., for dividing the wave energy into separate mutually coherent reference beam 102 and object beam 104. Coherent reference beam 102, as indicated by its center line 106, is incident on a given area of the surface of hologram recording medium 108 at a predetermined angle, as is conventional. The exposed given area, which is relatively small, has a dimension h in the plane of the paper.

Object 110, which may be a transparency containing the information in the single frame of a motion picture, is illuminated by object beam 104, indicated by its center line 112, which passes through the pinholes in pinhole array 114. Normally, the individual pinholes are quite small, preferably having a maximum dimension of ten micrometers or less (although for clarity in the drawing the pinholes of array 114 have been shown much larger). The spacing between adjacent pinholes is usually substantially larger than the size of a pinhole, preferably being anywhere from five to 1,000 times as large as the maximum dimension of the pinhole itself. Thus, the wave energy passing through pinhole array 114 will be diffracted thereby. Object 110 is situated as shown at an appropriate distance from pinhole array 114 to be spatially sampled with a sufficiently high resolution by the diffracted wave energy from pinhole array 114 incident thereon. It should be noted that wave energy from each pinhole in pinhole array 114 illuminates the entire object 110.

As is conventional in Fraunhofer holography, object 110 is located in the back focal plane of Fraunhofer focusing lens 116, which is situated as shown between object 110 and hologram recording medium 108. Although in FIG. 1 a single convex lens is used as the Fraunhofer focusing lens, a more complex lens means may be substituted therefor. In any case, object 110 is situated one focal length from the effective principal plane of the lens means actually employed.

Each sample portion of object 110 will give rise to a diverging component beam of coherent wave energy which is intensity modulated in accordance with the object information at that sample portion. All these diverging component beams are incident on lens 116, which transforms them into single parallel composite coherent information beam 118. The coherent wave energy of coherent information beam 118, as shown, is incident on the given area of the surface of hologram recording medium 108, where it interferes with the simultaneously incident wave energy of coherent reference beam 106, to record a redundant Fraunhofer hologram of the scene depicted by object 110.

In accordance with a well known principle of geometric optics, the reciprocal of the focal length of a convex lens is equal to the sum of the reciprocal of an object distance from the principal plane of the convex lens and the reciprocal of the image distance to the principal plane of the convex lens. Since lens 116 is a convex lens and object 110 is located in the focal plane of lens 116, the object distance for object 110 is equal to the focal length of lens 116 and the image distance is equal to infinity. It is for this reason that coherent information beam 118 is parallel, i.e., is a plane wavefront for each point of the object. However, lens 116 serves not only to image object 110 at infinity, but it also serves to image pinhole array 114 in an image plane located a distance q from the principal plane of lens 116. Distance q depends solely on the focal length f of lens 116 and the distance p of pinhole array 114 from the principal plane of lens 116, in accordance with the principle of geometric optics set forth above.

Since coherent information beam 118 is parallel, the distance between the principal plane of 116 and hologram recording medium 108 is uncritical from the point of view of obtaining a Fraunhofer hologram. Further, as stated above, when a moving redundant Fraunhofer hologram record, recorded with a pinhole array as the redundancy means, is played back, an undesirable moving-type noise occurs. It now has been found that this moving-type noise is due to the presence of pinhole array 114 and the imaging effect of lens 116 thereon. In the past, when the selected spacing between lens 116 and the position of hologram recording medium 108 was made without regard to the presence of pinhole array 114, the position of hologram recording medium 108 was placed far from the position of pinhole array image plane 120. Under these conditions, as the hologram record was moved during playback, the unwanted moving-type noise would occur at a rate sufficiently low as to be quite noticeable and annoying.

In accordance with the present invention, it has been found that if the position of hologram recording medium 108 is selected to substantially coincide with the position of pinhole array image plane 120, as shown in FIG. 1, any moving-type noise which occurs in the reconstructed image as the hologram being played back is moved, will occur at such a rapid rate as to be completely integrated out by persistance of vision. Thus, in effect, the moving-type noise is eliminated, since it cannot be noticed.

Figure 2:
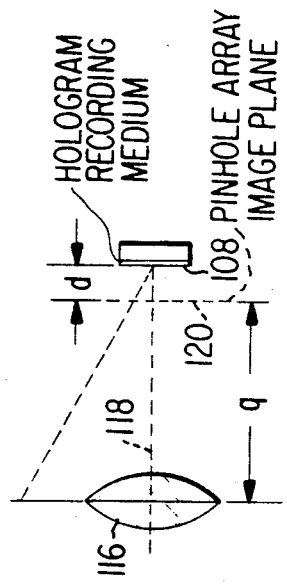
FIG. 2 shows a first modification of the embodiment of FIG. 1 in which the hologram recording medium is located a small distance behind the pinhole array image plane.
Figure 3:
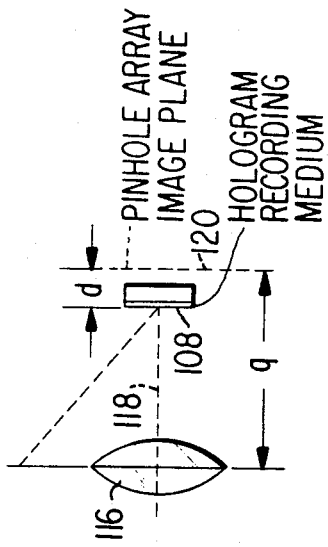
FIG. 3 shows a second modification of the embodiment of FIG. 1 in which the hologram recording medium is located a small distance in front of the pinhole array image plane.

If a hologram recording medium of sufficient dynamic range were available, the arrangement shown in FIG. 1 with hologram recording medium 108 in coincidence with pinhole array image plane 120 would be the best position to place hologram recording medium 108. However, due to the limited dynamic range of actual hologram recording mediums which are available, it is desirable to displace hologram recording medium 108 a small distance d in back of pinhole array image plane 120, as shown in FIG. 2, or in front of pinhole array image plane 120, as shown in FIG. 3. The reason for this is that the imaging of pinhole array 114 in image plane 120 results in the focusing of wave energy into discrete small spots in which the coherent wave energy is concentrated. The peak intensity of the wave energy in each of these small spots is normally higher than the upper end of the dynamic range of available hologram recording mediums, such as photoresists. Thus, saturation of the hologram recording medium occurs in the vicinity of each of these spots if, as shown in FIG. 1, hologram recording medium 108 is positioned in coincidence with image plane 120. However, by displacing medium 108 from image plane 120 by a small distance d, as shown in FIGS. 2 and 3, the peak intensity of the wave energy incident on any point of hologram recording medium 108 remains within its dynamic range. The value of d is sufficiently small, however, so that the rate of moving-type noise which occurs in the reconstructed image during playback of moving holograms still remains unnoticeable due to persistance of vision.

For instance, for a lens 116 having a focal length in the order of 50 millimeters and employing a hologram recording medium composed of Shipley AZ 1350 positive photoresist, a value of d of only a few millimeters at most is required to prevent saturation of the recording medium by incident coherent wave energy having a wave length of 4416 Angstroms obtained from a He-Cd laser. Normally d is in the order of 2 or 3 millimeters. However, moving-type noise is noticeably reduced to distances the order of a centimeter or so. Obviously, if the lens is of different focal length and/or the recording medium is of different dynamic range, the useful range of distance d will be different. In any case, the criteria for the maximum value of d is that which results in elimination or, at least, substantial reduction in moving-type noise in the reconstructed image of a moving redundant Fraunhofer hologram during playback. The criteria for the minimum value of d is that which is required to prevent any substantial amount of saturation of the recording medium occurring during the recording of the hologram.

Figure 4:
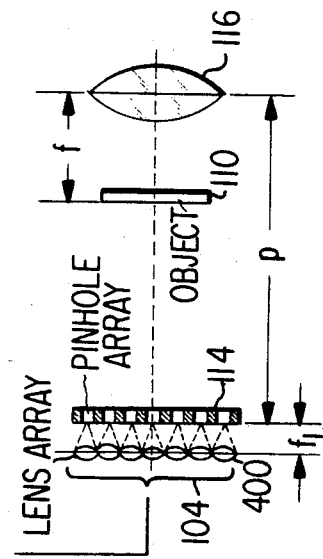
FIG. 4 shows a third modification of the embodiment of FIG. 1 employing a lens array in cooperative relationship with the pinhole array for concentrating the illuminating wave energy at the pinholes of the pinhole array.

In some cases, particularly where the pinholes are widely separated, it is desirable to employ as redundancy means, in addition to pinhole array 114, a corresponding lens array 400, as shown in FIG. 4. Lens array 400, which may be either a lenticular lens array or a Fresnel lens array, includes an individual lens element for each pinhole of array 114. The effective focal length of each of these lenses of array 400 is $f_1$, and pinhole array 114 is situated at a distance from the lens array 400 equal to $f_1$. Therefore, pinhole array 114 lies in the focal plane of lens array 1400. This results in the concentration of the available coherent wave energy in object beam 104 so that nearly all of it passes through pinhole array 114, rather than being blocked and absorbed by the portions of the array between the adjacent pinholes thereof. Thus, lens array 400 provides much greater optical efficiency for the recording of redundant Fraunhofer holograms than the arrangement shown in FIG. 1, in which a lens array is omitted. The wave energy from each lens must still cover the entire object transparency.

Returning to FIG. 1, with any given lens 116 having a given focal length f, the image distance q may be selected to have any predetermined value as dictated by considerations outside the present invention. In this case, the distance p of pinhole array 114 from the principal plane of lens 116 must be adjusted to that value which provides this predetermined value of q. Similarly, the distance p of pinhole array 114 from the principal plane of 116 may be predetermined by considerations which have nothing to do with the present invention, and then hologram recording medium 108 must be appropriately positioned with respect to the resulting position of pinhole array image plane 120. Further, both $p$ and $q$ may each have independently predetermined values, if a lens 116 is chosen having an appropriate focal length $f$. Of course, $p$, $q$ and $f$ cannot at the same time, all have independent values, since this would violate the principle geometric optics discussed above.

A further advantage of recording in this "imaged-aperture-array" mode is the following: Since the image of each pinhole of the aperture plate contains all the information necessary to reconstruct the entire image of the object, this recording mode tends to reduce flicker — parts of the picture becoming dimmer and brighten periodically. Because each recorded pinhole moves out of the reconstruction beam on playback almost instantaneously, the entire image of the object due to this pinhole does not illuminate the vidicon. This pinhole is replaced by a pinhole which has just moved into the reconstruction beam and its image is added to the light falling on the vidicon. In this way, there is a smoother fade in and fade out of successive frames of the object, e.g., a movie. This condition minimizes the effect of one pinhole moving out of the reconstruction beam and another pinhole moving into this beam.

What is claimed is:

1. In a redundant Fraunhofer hologram recording system for recording a plurality of motion picture frame objects, comprising:
    a. focusing lens means having a given focal length, one of said objects located substantially in the focal plane of said lens means on one side thereof, a hologram recording medium located on the other side of said lens means from said one object, and means including a pinhole array located on said one side of said lens means for illuminating said medium with an information beam of coherent wave energy which is spatially modulated in accordance with said one object, and means for simultaneously illuminating said medium with a reference beam of wave energy which is coherent with said information beam;
    b. the improvement wherein the respective distances of said pinhole array and said medium from the principal plane of said focusing lens means are selected with respect to said focal length so that said medium is located at or in the immediate vicinity of the image plane of said pinhole array.

2. The system defined in claim 1, wherein said medium has a dynamic range which saturates in response to incident wave energy at any point thereof exceeding a given value, wherein the peak intensity of wave energy at at least one point in said image plane exceeds said given value, and wherein said medium is displaced from said image plane by substantially the minimum amount required to prevent the intensity of wave energy incident on said medium from exceeding said given value at any point thereof.

3. The system defined in claim 2, wherein said distance of said medium from said principal plane is that given distance which provides a hologram of a predetermined size, and said distance from said pinhole array to said principal plane is that required to form an image plane having said displacement from said medium when said medium is located at said given distance.

4. The system defined in claim 1, wherein said distance of said medium from said given principal plane is that given distance which provides a hologram of a predetermined size, and said distance from said pinhole array to said principal plane is that required to form an image plane at or in the immediate vicinity of said medium.

* * * * *